US006388996B1

(12) United States Patent
Biedermann et al.

(10) Patent No.: US 6,388,996 B1
(45) Date of Patent: May 14, 2002

(54) BASE STATION WITH RAPID HANDOVER FUNCTION OF A CELLULAR TDMA/FDMA MOBILE RADIO SYSTEM, PARTICULARLY OF A CELLULAR DECT SYSTEM

(76) Inventors: Rolf Biedermann, Solmstr. 47a, D-48683 Ahaus Bundesrepublik Deutschland (DE); Josef Baumeister, Emil-Nolde-Weg 11, D-46325 Borken Bundesrepublik Deutschland (DE)

( * ) Notice: Subject to any disclaimer, the term of this patent is extended or adjusted under 35 U.S.C. 154(b) by 0 days.

(21) Appl. No.: 09/230,498
(22) PCT Filed: Sep. 12, 1997
(86) PCT No.: PCT/DE97/02060
§ 371 Date: Jan. 28, 1999
§ 102(e) Date: Jan. 28, 1999
(87) PCT Pub. No.: WO98/15148
PCT Pub. Date: Apr. 9, 1998

(30) Foreign Application Priority Data

Sep. 30, 1996 (DE) .......................................... 196 40 450

(51) Int. Cl.⁷ ................................................. H04J 3/00
(52) U.S. Cl. ........................................ 370/280; 370/337
(58) Field of Search ................................ 370/276, 277, 370/280, 337, 347, 331, 350

(56) References Cited

U.S. PATENT DOCUMENTS

| | | | | |
|---|---|---|---|---|
| 5,533,099 A | * | 7/1996 | Byrne | .......................... 455/552 |
| 5,825,757 A | * | 10/1998 | Tat et al. | .................... 370/330 |
| 5,995,502 A | * | 11/1999 | Fukuda | ....................... 370/350 |

FOREIGN PATENT DOCUMENTS

| | | |
|---|---|---|
| EP | 0 577 322 | 1/1994 |
| WO | WO 93/21719 | 10/1993 |
| WO | WO 94/10764 | 5/1994 |
| WO | WO 94/10811 | 5/1994 |
| WO | WO 94/13113 | 6/1994 |
| WO | WO 95/05040 | 2/1995 |

OTHER PUBLICATIONS

IEEE (1990), S. McCann et al, "Digital European Cordless Telecommunications system Blind spot Algorithm Evaluation Results", pp. 1023–1027.
DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.
IEEE Communications Magazine, Jan. 1995, David D. Falconer et al, Time Division Multiple Access Methods for Wireless Personal Communications, pp. 50–57.
ETSI—Publication, Oct. 1992, ETS 300175 1 . . . 9, Part 1: Overview, pp. 1–30; Part 2: Physical layer pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

(List continued on next page.)

Primary Examiner—Chau Nguyen
Assistant Examiner—D. Trinh (57) ABSTRACT

In order that a mobile part having a slow channel changing function can be synchronized in a manner which is economic in terms of frequencies and, at the same time, to at least two base stations having a fast channel changing function in a cellular TDMA/FDMA radio system, in particular in a cellular DECT/GAP system, the base station transmits broadcast information to the mobile part. The mobile part maintains a telecommunications link to one of the base stations in the radio system, using a predetermined transmit separation which is defined as a number of TDMA time slots and is greater than a receive separation which is predetermined by the slow channel changing function of the mobile part and is defined as a number of TDMA time slots.

7 Claims, 7 Drawing Sheets

OTHER PUBLICATIONS

Telcom Report 16 (1993), No. 1, J. H. Koch: "Digitaler Komfort für schnurlose Telekommunikation—DECT–Standard eröffmet neue Nutzungsgebiete", pp. 26–27.

tec 2/93—Das technische Magazin von Ascom "Wege zur universellen mobilen Telekommunikation", pp. 35 to 42.

Philips Telecommunication Review, R. J. Mulder, "DECT, a universal cordless access system", pp. 68–73.

ETSI—Publication, Apr. 1995, prETS 300444, Generic Access Profile, pp. 1–129.

Components 31 (1993), No. 6, S. Althammer, D. Brückmann: Hochoptimierte IC's für DECT—Schnurlostelefone, pp. 215–218.

Unterrichtsblätter—Deutsche Telekom Jg. 48, Feb. 1995, Protokolle am Beispiel des OSI–Referenzmodells, pp. 102–111.

* cited by examiner

| Time slot | 0 | 1 | 2 | 3 | 4 | 5 | 6 | 7 | 8 | 9 | 10 | 11 |
|---|---|---|---|---|---|---|---|---|---|---|---|---|
| SH-BS1, FH-BS1 | | | | | TB | | | | | | | |
| SH-MT$_{1,2}$ | | | | Blind | TB | Blind | | | | | | |
| FH-BS2 | | | | DB1 | | DB2 | | | | | | |

FIG 9

| Time slot | 0 | 1 | 2 | 3 | 4 | 5 | 6 | 7 | 8 | 9 | 10 | 11 |
|---|---|---|---|---|---|---|---|---|---|---|---|---|
| SH-BS1, FH-BS1 | | | | | TB | | | | | | | |
| SH-MT$_{1,2}$ | | | | Blind | TB | DB2 | | | | | | |
| FH-BS2 | | | | DB1 | | DB2 | | | | | | |

FIG 7

BASE STATION WITH RAPID HANDOVER FUNCTION OF A CELLULAR TDMA/FDMA MOBILE RADIO SYSTEM, PARTICULARLY OF A CELLULAR DECT SYSTEM

BACKGROUND OF THE INVENTION

In communication systems having a communication transmission path between a communication source and a communication sink, transmitting and receiving devices are used for communication processing and transmission in which 1) the communication processing and communication transmission can take place in a preferred transmission direction (simplex operation) or in both transmission directions (duplex operation),
2) the communication processing is analogue or digital,
3) the communication transmission via the long-distance transmission path takes place wire-free on the basis of various communication transmission methods FDMA (Frequency Division Multiple Access), TDMA (Time Division Multiple Access) and/or CDMA (Code Division Multiple Access) for example in accordance with radio standards such as DECT, GSM, WACS or PACS, 1S-54, PHS, PDC etc. (see IEEE Communications Magazine, January 1995, pages 50 to 57; D. D. Falconer et al: "Time Division Multiple Access Methods for Wireless Personal Communications") and/or by wire.

"Communication" is a generic term which covers both the message content (information) and the physical representation (signal). Despite a communication having the same message content—that is to say the same information— different signal forms may occur. Thus, for example, a communication relating to an item may be transmitted in any of the following forms (1) an image,
(2) as the spoken word,
(3) as the written word,
(4) as an encrypted word or image.

The type of transmission according to forms (1), (2) and (3) is in this case normally characterized by continuous (analogue) signals, while the type of transmission according to forms (4) normally takes place by means of discontinuous signals (for example pulses, digital signals).

On the basis of this general definition of a communication system, the invention relates to a base station having a fast channel changing function in a cellular TDMA/FDMA radio system, in particular in a cellular DECT system.

A cellular radio system, as a subset of the previously defined communication system is, for example, the cellular DECT-System (Digital Enhanced (previously: European) Cordless Telecommunication; see (1): Nachrichtentechnik Elektronik 42 (Electronic telecommunication 42) (1992) January/February No. 1, Berlin, DE: U. Pilger "Struktur des DECT-Standards" (Structure of the DECT Standard), pages 23 to 29 in conjunction with the ETSI Publication ETS 300175-1 . . . 9, October 1992; (2): Telcom Report 16 (1993), No. 1, J. H. Koch: "Digitaler Komfort für schnurlose Telekommunikation—DECT-Standard eröffnet neue Nutzungsgebiete" (Digital convenience for cordless telecommunications—DECT Standard opens up new application areas), pages 26 and 27; (3): tec 2/93—the Technical Magazine from Ascom "Wege zur universellen mobilen Telekommunikation" (Universal mobile telecommunication techniques), pages 35 to 42; (4): Philips Telecommunication Review, Vol. 49, No. 3, September 1991, R. J. Mulder: "DECT, a universal cordless access system"; (5): WO 93/21719 (FIGS. 1 to 3 with associated description)) or the cellular GAP-System (Generic Access Profile; ETSI-Publikation prETS 300444, April 1995, Final Draft, ETSI, FR), which may be designed, for example, on the basis of a monocellular DECT/GAP system (Single Cell System) according to FIG. 1 and in accordance with the illustration in FIGS. 4 and 5.

Figure 1:
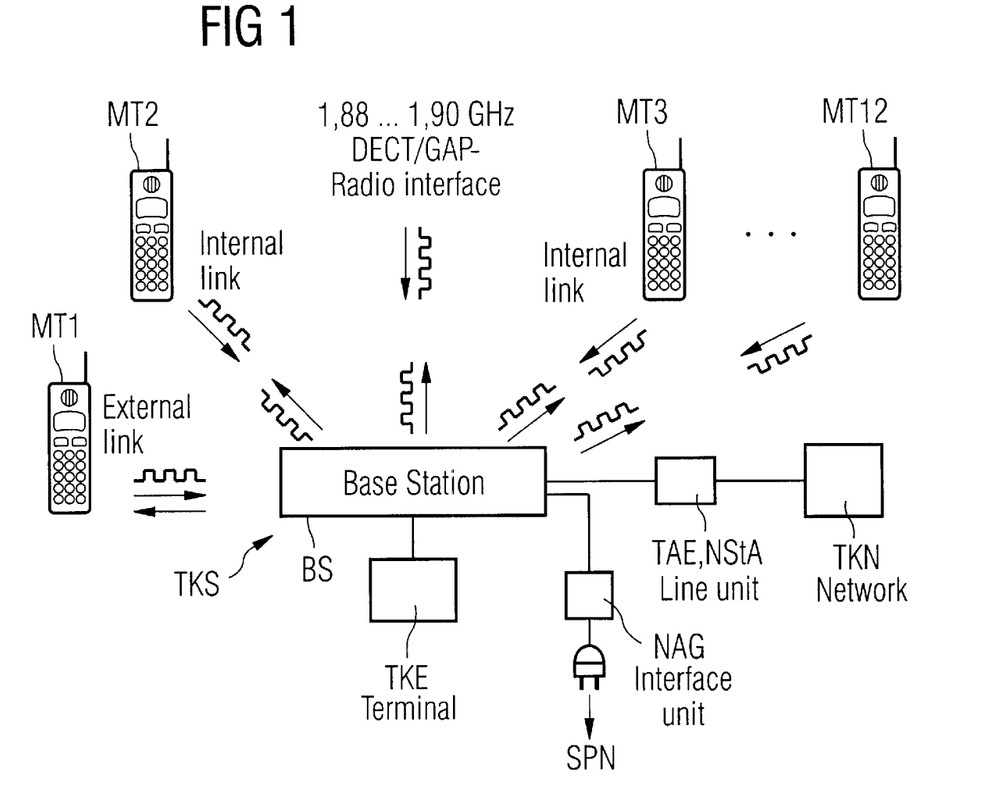
FIG. 1 depicts a monocellular DECT/GAP system.

According to the DECT/GAP Standard and in accordance with the illustration in FIG. 1, a DECT/GAP radio interface which is designed for the frequency band between 1.88 and 1.90 GHz can be used to set up on a DECT/GAP base station BS a maximm of 12 links, using the TDMA/FDMA/TDD method (Time Division Multiple Access/Frequency Division Multiple Access/Time Division Duplex) in parallel with DECT/GAP mobile parts MT1 . . . MT12. The figure of 12 results from a number "kg" of time slots or telecommunications channels available for duplex operation of a DECT/GAP system (k=12). The links may in this case be internal and/or external. In the case of an internal link, two mobile parts which are registered at the base station BS, for example the mobile part MT2 and the mobile part MT3, can communicate with one another. In order to set up an external link, the base station BS is connected to a telecommunications network TKN, e.g. in cable form via a telecommunications line unit TAE, or a private branch exchange is connected to a cable telecommunications network, or (according to PCT Reference WO 95/05040 in wire-free form as a repeater station) to a higher-level telecommunications network. In the case of the external link, it is possible to communicate with a mobile part, for example with a mobile part MT1, via the base station BS and the telecommunications line unit TAE, or for the private branch exchange NStA to communicate with a subscriber in the telecommunications network TKN. If—as in the case of Gigaset 951 (Siemens cordless telephone, see Telcom Report 16, (1993) Issue 1, pages 26 and 27)—the base station BS has only one connection to the telecommunications line unit TAE or to the private branch exchange NStA, then only one external link can be set up. If—as in the case of Gigaset 952 (Siemens cordless telephone; see Telcom Report 16, (1993), Issue 1, pages 26 and 27)—the base station BS has two connections to the telecommunications network TKN then, in addition to the external link to the mobile part MT1, a further external link is possible from a cable telecommunications terminal TKE connected to the base station BS. In this case it is also in principle feasible for a second mobile part, for example the mobile part MT12, to use the second connection for an external link, instead of the telecommunications terminal TKE. While the mobile parts MT1 . . . MT12 are operated using a battery or a rechargeable battery, the base station BS, which is designed as a small cordless exchange, is connected to a voltage network SPN via a network interface unit NAG.

Figure 2:
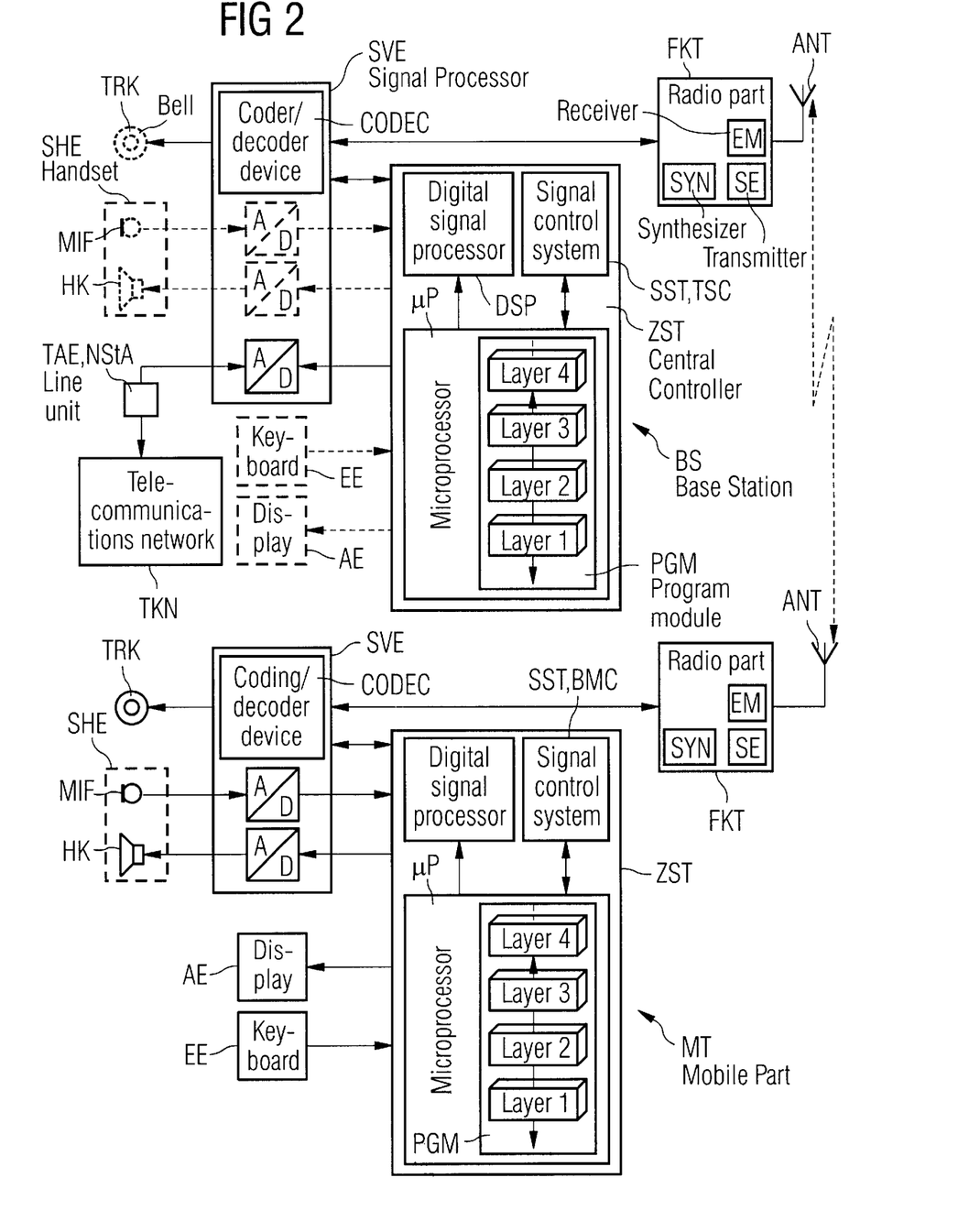
FIG. 2 depicts the base station and mobile part.

Based on the document Components 31 (1993), Issue 6, pages 215 to 218; S. Althammer, D. Brückmann: "Hochoptimierte IC's für DECT-Schnurlostelefone" (Highly optimized ICs for DECT cordless telephones), FIG. 2 shows the basic circuit design of the base station BS and of the mobile part MT according to FIG. 1. According to this figure, the base station BS and the mobile part MT have a radio part FKT with an antenna ANT used for transmitting and receiving radio signals, a signal processing device SVE and a central controller ZST, which are connected to one another in the illustrated manner. The radio part FKT essentially contains the known devices such as the transmitter SE, the receiver EM and the synthesizer SYN. The signal processing device SVE contains, inter alia, a coding/decoding device CODEC. Both for the base station BS and for the mobile part MT, the central controller ZST has a microprocessor $\mu$P with a program module PGM designed in accordance with the OSI/ISO layer model (see (1): Instruction Sheets—Deutsche Telekom, Year 48, 2/1995, pages 102 to 111; (2): ETSI Publication ETS 300175-1 . . . 9, October 1992), a signal control section SST and a digital signal processor DSP, which are connected to one another in the illustrated manner. Of the layers defined in the layer model, only the first four layers, which are absolutely essential for the base station BS and for the mobile part MT$\lambda$ are illustrated. The signal control section SST in the base station BS is designed as a Time Switch Controller TSC, and that in the mobile part MT is designed as a Burst Mode Controller BMC. The major difference between the two signal control sections TSC, BMC is that the base-station-specific signal control section TSC also carries out switching functions that the mobile-part-specific signal control section BMC does not.

The basic method of operation of the circuit units mentioned above is described, for example, in the document cited above, Components 31 (1993), Issue 6, pages 215 to 218.

The circuit layout described according to FIG. 2 is supplemented by additional functional units in the base station BS and in the mobile part MT in accordance with their function in the DECT/GAP system according to FIG. 1.

The base station BS is connected to the telecommunications network TKN via the signal processing device SVE and the telecommunications line unit TAE or the private branch exchange NStA. As an option, the base station BS may also have an operator interface (functional units shown dashed in FIG. 2) which, for example, comprises an input device EE designed as a keyboard, an indicator device AE designed as a display, a speech/listening device SHE designed as a handset with a microphone MIF and a listening capsule HK, as well as a bell TRK.

The mobile part MT has the operator interface which may be used as an option for the base station BS, with the control elements described above associated with this operator interface.

Figure 3:
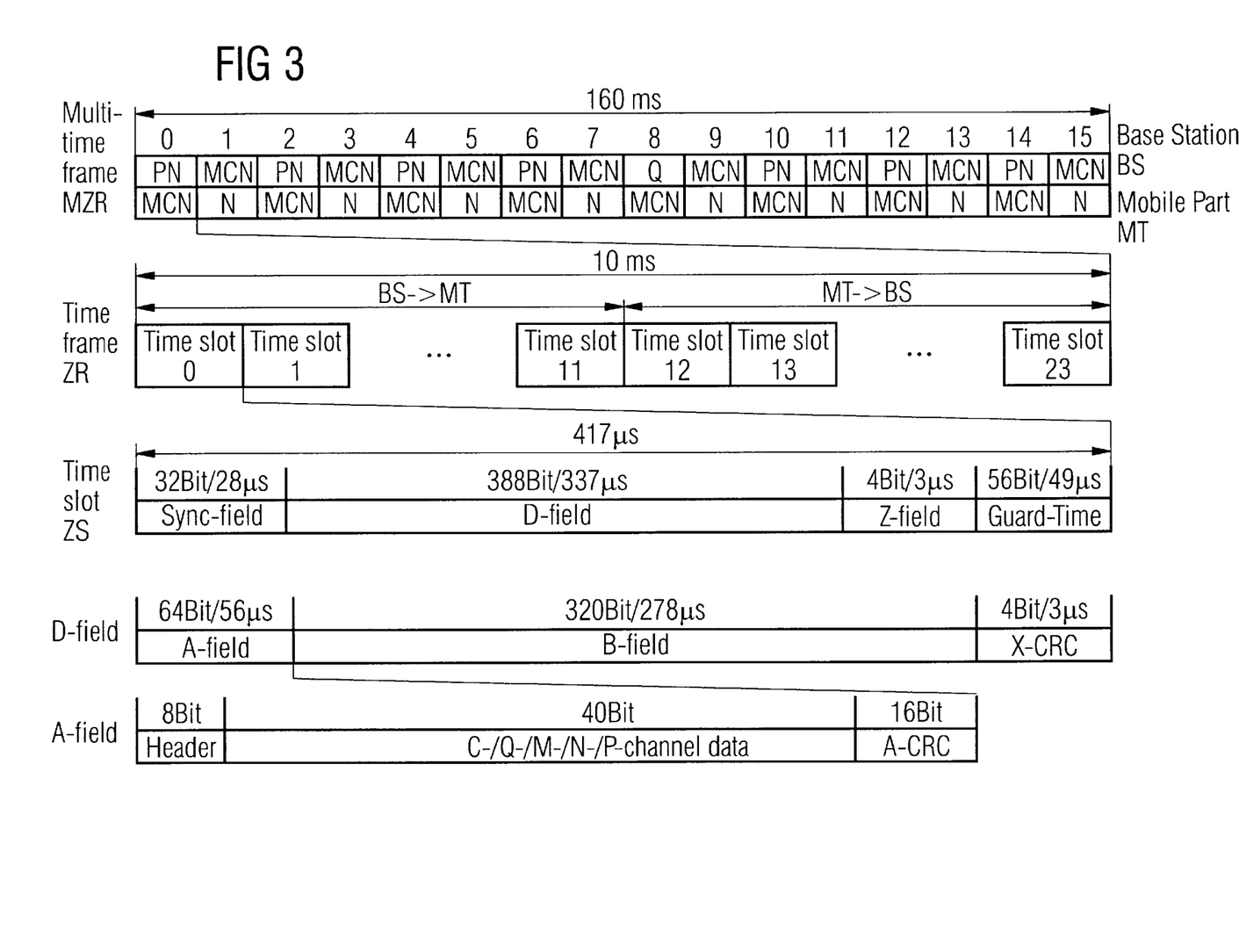
FIG. 3 depicts the TDMA structure of the FIG. 1 system.

Based on the document "Nachrichtentechnik Elektronik 42" (Electronic telecommunications 42) (1992) January/February, No. 1, Berlin, DE; U. Pilger: "Struktur des DECT-Standards" ("Structure of the DECT Standard"), pages 23 to 29 in conjunction with ETS 300 175-1 . . . 9, October 1992", FIG. 3 shows the TDMA structure of the DECT/GAP system TKS according to FIG. 1. In terms of the multiple access methods, the DECT/GAP system is a hybrid system in which radio messages can be transmitted in a predetermined time sequence from the base station BS to the mobile part MT and from the mobile part MT to the base station BS using the FDMA principle at ten frequencies in the frequency band between 1.88 and 1.9 GHz and using the TDMA principle according to FIG. 3 (Time Division Duplex operation). The time sequence is in this case governed by a multi-time frame MZR which occurs every 160 ms and has 16 time frames ZR each with a time duration of 10 ms. Information which relates to a C, M, N, P, Q channel defined in the DECT Standard is transmitted separately to the base station BS and the mobile part MT in these time frames ZR. If information for a number of these channels is transmitted in a time frame ZR, then the transmission takes place in accordance with a priority list where M>C>N and P>N. Each of the 16 time frames ZR in the multi-time frame MZR is in turn split into 24 time slots ZS each having a time duration of 417 $\mu$s, of which 12 time slots ZS (time slots 0 . . . 11) are allocated to the transmission direction "base station BS→mobile part MT" and a further 12 time slots ZS (time slots 12 . . . 23) are allocated to the transmission direction "mobile part MT→base station BS". Information with a bit length of 480 bits is transmitted in each of these time slots ZS, in accordance with the DECT Standard. Of these 480 bits, 32 bits are transmitted as synchronization information in a SYNC field and 388 bits as wanted information in a D field. The remaining 60 bits are transmitted as additional information in a Z field and as protection information in a "Guard Time" field. The 388 bits which are transmitted as wanted information in the D field are in turn split into a 64-bit long A field, a 320-bit long B field and a 4-bit long "X-CRC" word. The 64-bit long A field is composed of an 8-bit long data header, a 40-bit long data record with data for the C, Q, M, N, P channels and a 16-bit long "A-CRC" word.

On the basis of PCT Reference WO94/10811 (Patent Claims 1 and 2), it is possible for the base station BS and/or the mobile part MS according to FIGS. 1 to 3 to have a radio part which is able to carry out either a fast channel change or a slow channel change. The terms used in these cases are a "Fast Hopping" radio part (FH radio part) and a "Slow Hopping" radio part (SH radio part). In consequence, the base station BS is either an FH base station or an SH base station, and the mobile part is either an FH mobile part or an Sh mobile part.

Figure 4:
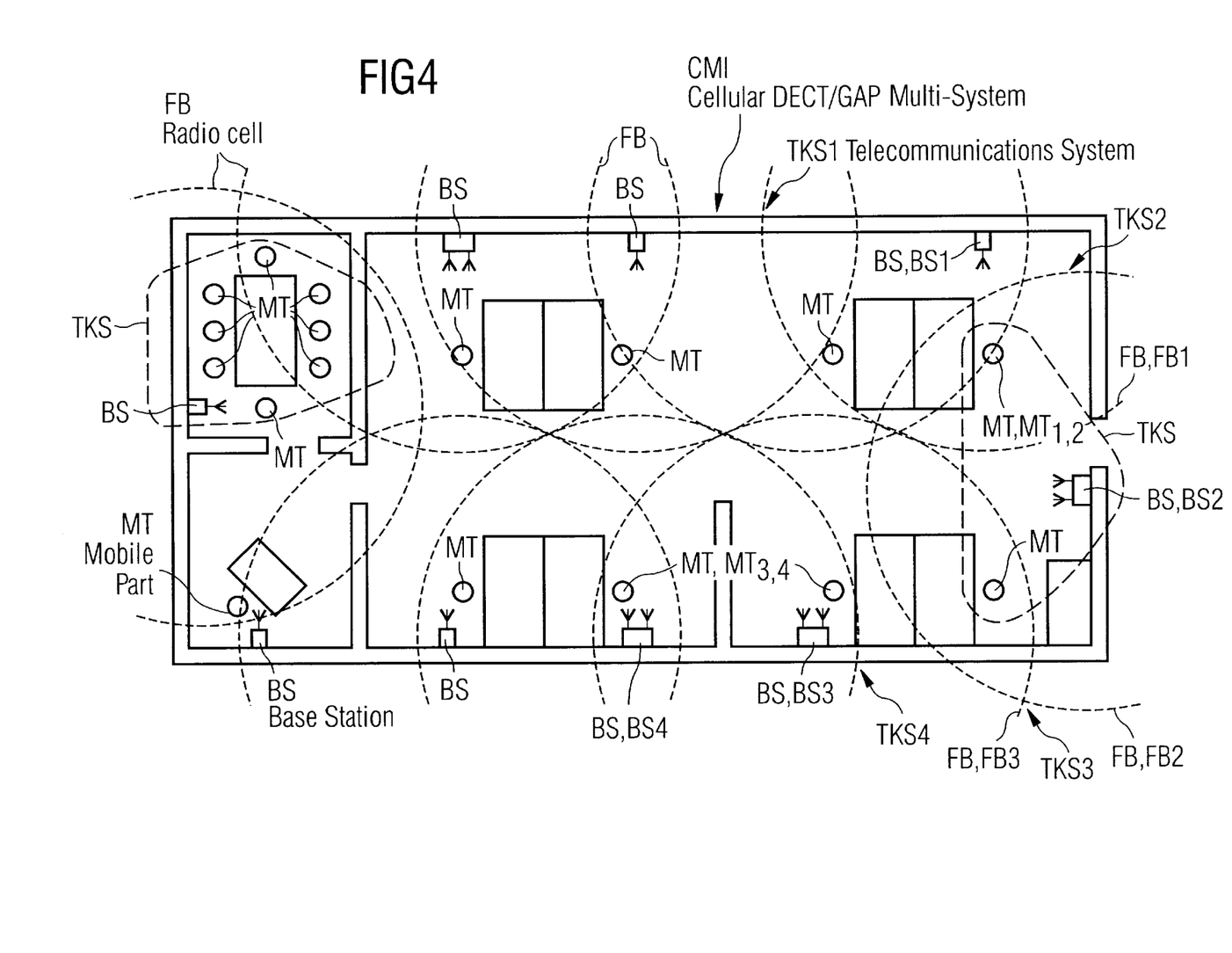
FIG. 4 depicts a cellular DECT/GAP multi-system cordless multi-cell integration.

Based on the DECT/GAP system according to FIG. 1, FIG. 4 shows a cellular DECT/GAP multi-system CMI (Cordless Multicell Integration), in which a number of the DECT/GAP systems TKS described above are present, each having a base station BS and one or more mobile parts MT concentrated—in the sense of a "hot spots" arrangement—at any given geographic location, for example in an administration building with large open-plan offices occupying whole floors. Instead of a "closed" geographic location, such as the administration building, an "open" geographic location with strategic telecommunications significance is, alternatively, also possible, for example areas in cities with a high volume of traffic, a major agglomeration of commercial units and a large amount of movement by people, for the installation of a cellular DECT/GAP multi-system CMI. Some of the base stations BS arranged in the large office are, in contrast to the base stations shown in FIGS. 1 and 2, in this case designed in accordance with PCT Reference WO 94/10764 as antenna diversity base stations. The concentration of DECT/GAP systems TKS is in this case designed (gap-free radio coverage of the geographic location) such that individual DECT/GAP systems TKS operate in the same vicinity, with the cellular DECT/GAP radio areas FB overlapping.

The same vicinity can in this case mean, depending on the amount of overlapping, that a) a first base station BS1 in a first telecommunications system TKS1 is arranged in a first radio area FB1 (radio cell), and a second base station BS2 in a second telecommunications system TKS2 is arranged in a second radio area FB2 (radio cell) and they can set up telecommunications links to at least one mobile part $MT_{1,2}$, b) a third base station BS3 in a third telecommunications system TKS3 and a fourth base station BS4 in a fourth telecommunications system TKS4 are arranged in a common, third radio area FB3 (radio cell) and can set up telecommunications links to at least one mobile part $MT_{3,4}$.

In order to set up telecommunications links between the base station or stations BS and the mobile parts MT in DECT/GAP systems according to FIGS. 1 to 4, the base station BS (Radio Fixed Part RFP) transmits at regular time intervals via the DECT radio interface, and on simplex transmission paths, the so-called "Dummy Bearer" (first information carrier), broadcast information which is received by the mobile part MT (Radio Portable Part RPP) according to FIGS. 1 to 4 and is used by it for synchronization and for setting up the link to the base station. The broadcast information need not necessarily be transmitted via the "Dummy Bearer".

It is also possible for no "Dummy Bearer" to be required, because the base station already maintains at least one telecommunications link, the so-called "Traffic Bearer" (second information carrier) to another mobile part, on which it then transmits the necessary broadcast information. In this case, the mobile part which would like to have a telecommunications link to a base station can receive the broadcast information as if said broadcast information were transmitted via the "Dummy Bearer".

According to the ETSI publication ETS 300175-3, October 1992, Section 9.1.1.1, the broadcast information contains information about access rights, system information and paging information.

The system information furthermore contains additional information which informs the mobile part of the TDMA time slots which are available at the base station. In the DECT Standard (ETSI Publication ETS 300175-3, October 1992, Section 11.4.1, Note 4) and the GAP Standard which is a subset of the DECT Standard and has the task of ensuring interoperability of the DECT radio interface for telephone applications (see ETSI Publication prETS 300444, April 1995, Section 10.3.3), this additional information is called "Blind Slot" information or "Poor Channel" information. The transmission of the additional information is based on the "Blind Slot Effect" which occurs in TDMA/FDMA radio systems, like the DECT system. The "Blind Slot Effect" occurs in particular when a) base stations according to FIG. 2 each have only one radio part with one transmitter and receiver and can thus transmit or receive on only one frequency during a time slot; if the base station maintains a duplex radio link in a specific pair of time slots, then it cannot set up any further radio links to other mobile parts in this pair of time slots;

b) base stations according to PCT Reference WO 94/10811 cannot transmit or receive in certain time slots because of technical restrictions (for example DECT base stations with a "Slow Hopping" radio part).

Case b) is irrelevant in the following text since the present invention is based on base stations having a fast channel changing function (FH base stations).

Links are set up in accordance with the rules of channel selection (see ETSI Publication ETS 300175-3, October 1992, Section 11.4), according to which a new channel is selected for setting up a new link and the connection request (SETUP request) is transmitted. The channel selection is in this case carried out essentially in the central controller ZST of the mobile part MT or of the base station BS according to FIG. 2.

The "Blind Slot Effect" which has been explained above in the context of the base station BS also occurs, of course, in the mobile part MT; this arises, in particular, when a) mobile parts according to FIG. 2 each have only one radio part with one transmitter and receiver and can thus transmit or receive at only one frequency during a time slot; if the mobile part maintains a duplex radio link to a base station in a specific pair of time slots, then it cannot set up any further radio links to another base station in this pair of time slots;

b) mobile parts according to PCT Reference WO 94/10811 cannot transmit or receive in certain time slots because of technical restrictions (for example DECT mobile parts with a "Slow Hopping" radio part).

On the basis of the above statements and the fact that, on the one hand, "Fast Hopping" radio parts are considerably more complex to develop than "Slow Hopping" radio parts and are thus more expensive and, on the other hand, there is interest in manufacturing the mobile parts as cost-effectively as possible, a scenario results in which the cellular DECT/GAP system according to FIG. 4 contains base stations with a fast channel changing function (Fh base stations) and mobile parts with a slow channel changing function (SH mobile parts).

Figure 5:
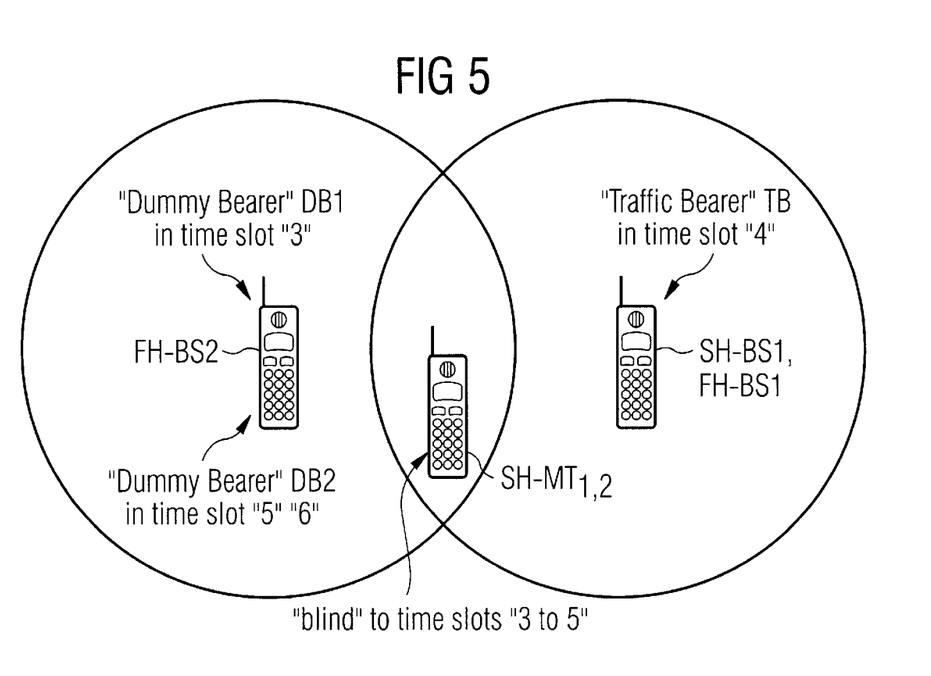
FIG. 5 depicts a system having a mobile part with a slow channel changing function.

In consequence—according to FIG. 5—such a system contains for example an SH mobile part (mobile part with a slow channel changing function) $SH-MT_{1,2}$, which can be connected at the same time to two base stations—an SH base station (base station with a slow channel changing function) SH-BS1 and an FH base station (base station with a fast channel changing function) FH-BS2 or two FH base stations (base stations with a fast channel changing function) FH-BS1, FH-BS2—by telecommunication. While the the SH mobile part $SH-MT_{1,2}$ is connected to a first SH/FH base station SH-BS1, FH-BS1 by telecommunication, the SH mobile part $SH-MT_{1,2}$—because it is located in the area where the radio areas FB1, FB2 overlap—could at the same time first of all set up, by synchronization, a telecommunications link in spe to a second FH base station FH-BS2 (keyword: roaming, handover). This synchronization is initiated by transmitting the broadcast information mentioned above from the respective base station to the relevant mobile part. The broadcast information can in this case—as already mentioned—be transmitted via a "Dummy Bearer" or a "Traffic Bearer". For reasons of spectral efficiency in DECT/GAP systems, not more than, for example, two TDMA time slots (transmission time slots for the respective base station) should be used for transmitting the broadcast information. This results in the following problem:

If, for example, the second FH base station FH-BS2 transmits the broadcast information via a "Dummy Bearer" in the time slots "3" and "5" (for example the first "Dummy Bearer" DB1 in time slot "3" and the second "Dummy Bearer" DB2 in time slot "5") to the SH mobile part $SH-MT_{1,2}$, and if this SH mobile part $SH-MT_{1,2}$ at the same time uses a "Traffic Bearer" TB to maintain a telecommunications link to the first SH/FH base station SH-BS1, FH-BS1 in the time slot "4", then the SH mobile part $SH-MT_{1,2}$—as a result of the fact that, because of the SH radio part, it cannot change from an active time slot to adjacent time slots when a frequency change takes place—cannot receive the broadcast information transmitted from the second FH base station FH-BS2 ("Blind Slots" Effect).

Figure 6:
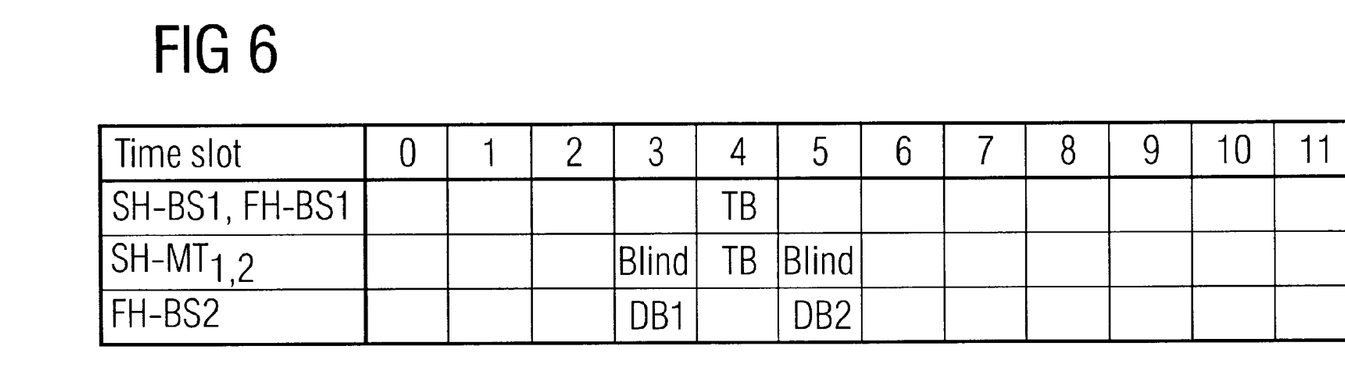
FIG. 6 depicts a time slot allocation table.

FIG. 6 uses a time slot allocation table to show that the SH mobile part $SH-MT_{1,2}$ is "blind" for signals which the second FH base station FH-BS2 transmits in the time slots "3" to "5". Because of the "Traffic Bearer" TB, the SH mobile part $SH-MT_{1,2}$ cannot receive anything in the time slot "4" and, because of the SH radio part, the SH mobile part $SH-MT_{1,2}$ cannot receive the "Dummy Bearers" DB1, DB2 in the time slots "3" and "5".

SUMMARY OF THE INVENTION

The object on which the invention is based is to make it possible for a mobile part with a slow channel changing function to be synchronized in a manner which is economic in terms of frequencies and, at the same time, to at least two base stations—for example to two base stations having a fast channel changing function—in a cellular TDMA/FDMA radio system, in particular a cellular DECT/GAP system.

In general terms the present invention is a base station having a fast channel changing function in a cellular TDMA/FDMA radio system, in particular in a cellular DECT/GAP system. At least one base station having a fast channel changing function is arranged in radio cells of the cellular TDMA/FDMA radio system. A first radio module can be switched to any frequency of the TDMA/FDMA radio system. The base station can be connected by telecommunication to a mobile part having a slow channel changing function of the TDMA/FDMA. The base station emits information carriers. In order to receive the information carriers, the mobile part has a second radio module which includes a receive separation which occupies a first number "n" of TDMA time slots where "n≧2". A means for forming a pair of information carriers has a first information carrier and/or a second information carrier. These are designed such that a transmit separation, which occupies a second number "m" of TDMA time slots, between the two information carriers of the pair of information carriers is greater than the receive separation of the second radio module. The means are connected to the first radio module in order to transmit the pair of information carriers.

Advantageous developments of the present invention are as follows.

The transmit separation between the two information carriers of the pair of information carriers occupies three TDMA time slots. The receive separation between the two information carriers of the pair of information carriers occupies two TDMA time slots.

The mobile part which can be connected to the base station by telecommunication, is located in a region where the radio cells overlap or intersect.

The first information carrier is a "Dummy Bearer".

The second information carrier is a "Traffic Bearer".

A DECT-specific base station in a DECT system, which base station can be connected to a DECT-specific mobile part by telecommunication.

The idea on which the invention is based is that a base station having a fast channel changing function in a cellular TDMA/FDMA radio system, in particular a cellular DECT/GAP system, transmits broadcast information to a mobile part having a slow channel changing function in the radio system, which already maintains a telecommunications link to another base station in the radio system, in a predetermined transmit separation which is defined as a number of TDMA time slots and is greater than a receive separation which is predetermined by a slow channel changing function in the mobile part and is defined as a number of TDMA time slots.

The transmit separation is in this case preferably determined by a program module in the central controller of the base station.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 7:
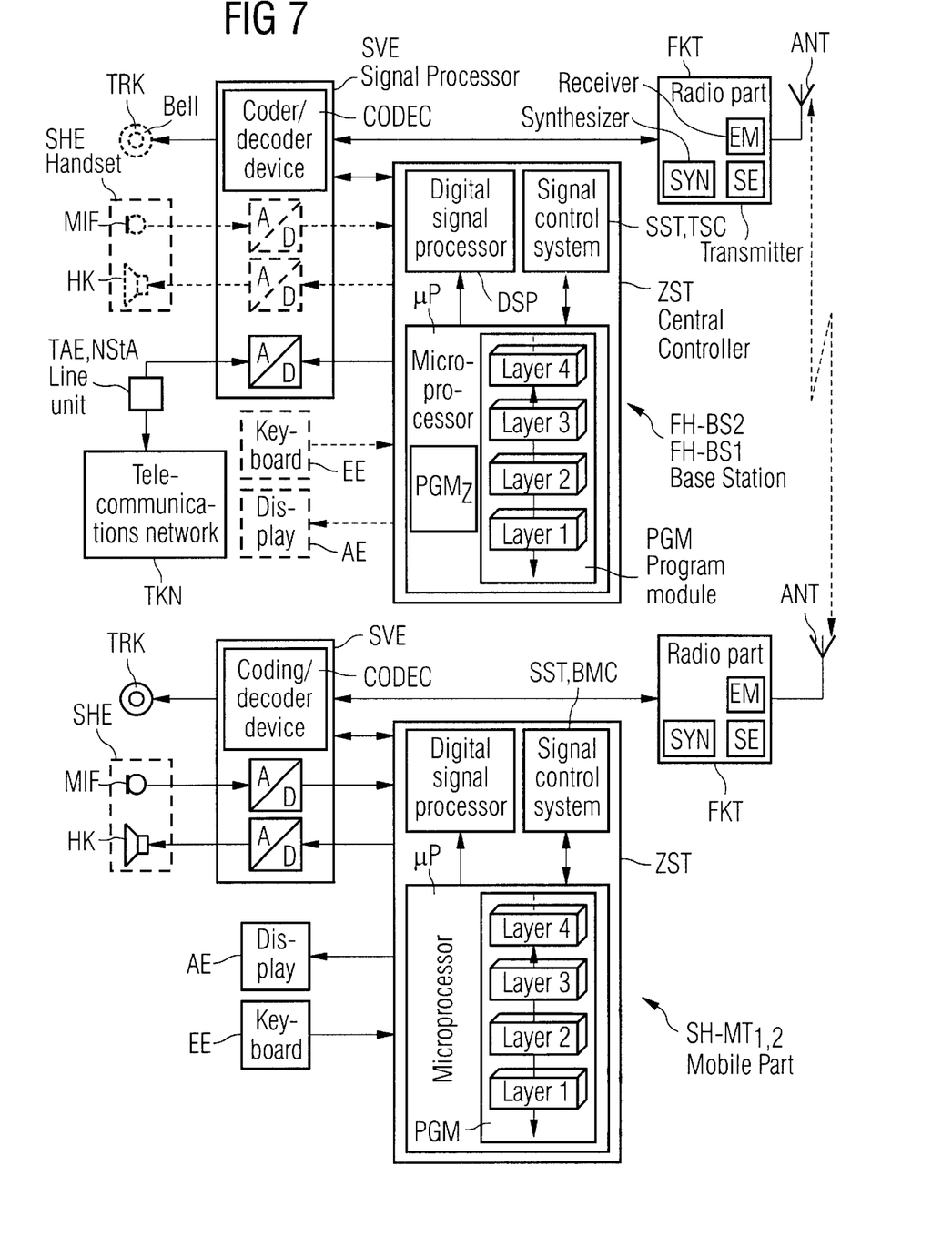
FIG. 7 depicts a second base station and mobile part.

FIG. 7 is based on FIGS. 2 and 5 and shows the basic circuit layout of the second FH base station (base station having a fast channel changing function) FH-BS2 and of the SH mobile part (mobile part having a slow channel changing function) SH-$MT_{1,2}$. This circuit layout and the following statements also apply to the first FH base station FH-BS1, which may be designed (see the description relating to FIG. 5) as an FH base station. In the case of SH mobile part SH-$MT_{1,2}$, the radio part FKT which is illustrated in FIG. 2 is designed as an SH radio part SH-FKT which cannot change from an active time slot to adjacent time slots during a frequency change. Instead of this, the SH radio part SH-FKT can first change to the respective next-but-one time slot. The receive separation of the SH radio part SH-FKT is thus a first number (n) of time slots where "n≧2". In the present exemplary embodiment "n=2".

In the second FH base station FH-BS2, the radio part FKT which is illustrated in FIG. 2 is designed as an FH radio part FH-FKT which can change from an active time slot to adjacent time slots during a frequency change. In addition, the central controller ZST of the second FH base station FH-BS2 has an additional program module $PGM_z$, which is designed in such a manner that, taking account of the spectral efficiency in a DECT/GAP system, the SH mobile part SH-$MT_{1,2}$ can in all cases receive the broadcast information transmitted from the FH base station FH-BS2 according to FIG. 5.

CASE I

If—as illustrated in FIGS. 5 and 6—the second base station FH-BS2 transmits the broadcast information via the two "Dummy Bearers" DB1, DB2 in the course of channel selection—the first "Dummy Bearer" DB1 being positioned, for example,—as shown in FIGS. 5 and 6—in time slot "3", then the program module $PGM_z$ ensures that the second "Dummy Bearer" DB2 is positioned in a time slot which is offset by a second number (m) of time slots, where "m>n", from the time slot "3" for the first "Dummy Bearer" DB1. In the present exemplary embodiment, "m=±3" (see FIGS. 8 and 9).

CASE II

If the second base station FH-BS2 transmits the broadcast information via a "Dummy Bearer", for example the first "Dummy Bearer" DB1 in the course of channel selection, which "Dummy Bearer" DB1 is positioned, for example,— as illustrated in FIGS. 5 and 6—in time slot "3", and if, in addition, a further time slot is intended to be activated for a "Traffic Bearer" TB, then the program module $PGM_z$ ensures—if possible—that the "Traffic Bearer" is positioned in a time slot which is offset by the second number (m) of time slots, where "m>n", from the time slot "3" for the first "Dummy Bearer" DB1. In the present exemplary embodiment, "m=±3" (see FIGS. 8 and 9).

If the "Traffic Bearer" can be positioned in such a time slot, then the time slot "3" for the first "Dummy Bearer" DB1 can be deactivated. If not, the first "Dummy Bearer" DB1 must be moved to a time slot which is appropriate for transmitting the broadcast information.

CASE III

If the broadcast information is not transmitted from the second base station FH-BS2 via a "Dummy Bearer" in the course of channel selection and if a time slot is intended to be activated for a new "Traffic Bearer", then the program module $PGM_z$ ensures—if possible—that the new "Traffic Bearer" is positioned in a time slot which is offset by the second number (m) of time slots, where "m>n", from a time slot for an already existing (old) "Traffic Bearer". In the present example, "m=±3" (see FIGS. 8 and 9).

Figure 8:
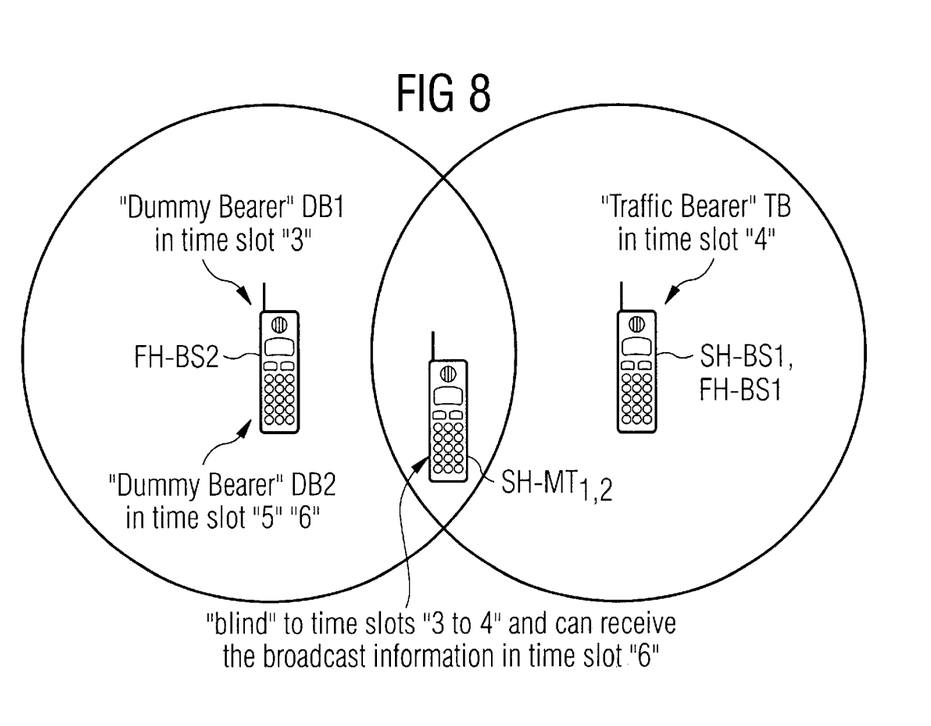
FIG. 8 depicts relationships for transmission of broadcast information.
Figure 9:
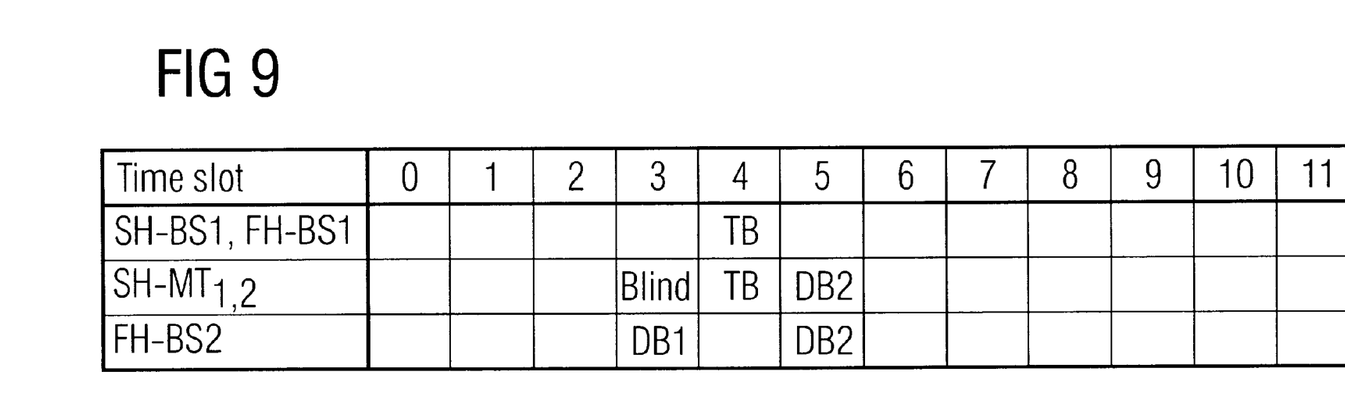
FIG. 9 depicts further relationships for transmission of broadcast information.

If the new "Traffic Bearer" can be positioned in such a time slot, then the broadcast information is transmitted in this time slot. Otherwise, a "Dummy Bearer" must be moved to a time slot which is appropriate for transmitting the broadcast information.

Based on FIGS. 5 and 6, FIGS. 8 and 9 show the relationships, in conjunction with the transmission of broadcast information, for the cases explained by the description of FIG. 7.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A base station having a fast channel changing function in a cellular TDMA/FDMA radio system, comprising:

the base station which has a fast channel changing function being in radio cells of the cellular TDMA/FDMA radio system;

a first radio module that is switchable to any frequency of the TDMA/FDMA radio system;

the base station being connectable by telecommunication to a mobile part having a slow channel changing function of the TDMA/FDMA;

the base station emitting information carriers, whereby, in order to receive the information carriers, the mobile part has a second radio module which includes a receive separation which occupies a first number "n" of TDMA time slots where $n \geq 2$;

a device for forming a pair of information carriers, the pair of information carriers having at least one of a first information carrier and a second information carrier, such that a transmit separation, which occupies a second number "m" of TDMA time slots, between the first and second information carriers of the pair of information carriers is greater than a receive separation of the second radio module;

the device connected to the first radio module in order to transmit the pair of information carriers.

2. The base station according to claim 1, wherein the transmit separation between the first and second information carriers of the pair of information carriers occupies three TDMA time slots, and wherein the receive separation between the first and second information carriers of the pair of information carriers occupies two TDMA time slots.

3. The base station according to claim 1, wherein the mobile part which is connectable to the base station by telecommunication, is located in a region where the radio cells overlap or intersect.

4. The base station according to claim 1, wherein the first information carrier is a "Dummy Bearer".

5. The base station according to claim 1, wherein the second information carrier is a "Traffic Bearer".

6. The base station according to claim 1, wherein the base station is a DECT-specific base station in a DECT system, which base station is connectable to a DECT-specific mobile part by telecommunication.

7. The base station according to claim 1, wherein the cellular TDMA/FDMA radio system is a cellular DECT/GAP system.

* * * * *